United States Patent Office 3,549,740
Patented Dec. 22, 1970

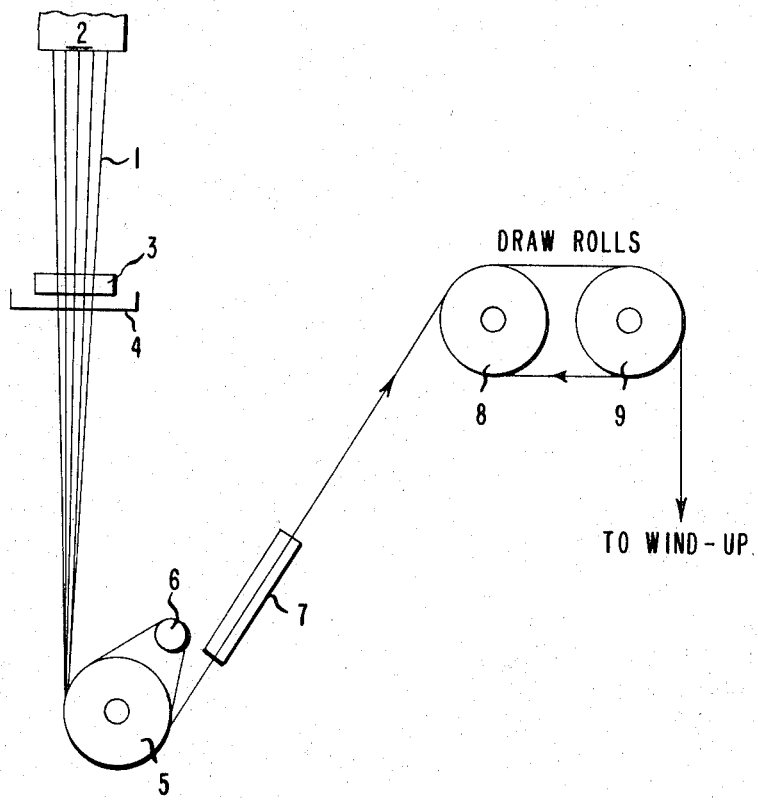

3,549,740
TREATMENT OF POLYESTER FIBERS TO
IMPROVE ADHESION OF RUBBER
Eckhard Christian August Schwarz, Grifton, N.C., assignor to E. I. du Pont de Nemours and Company, Wilmington, Del., a corporation of Delaware
Filed Dec. 14, 1966, Ser. No. 601,661
Int. Cl. D01d 5/12
U.S. Cl. 264—210    6 Claims

ABSTRACT OF THE DISCLOSURE

Adhesion of rubber to polyester fiber reinforcement, as in tires, is greatly improved by isocyanate treatment of the fibers during manufacture. A solution of an organic isocyanate of low volatility in an inert volatile organic liquid is applied to continuous polyester filaments intermediate of the spinning and drawing operations, and the filaments are then drawn to at least twice their length at a temperature of at least 120° C. in the presence of steam to react with the isocyanate and form a polyurea coating.

---

This invention relates to surface treatments for polyester structures. More particularly, it relates to a method for changing the surface character of a polyester structure to improve its ability to adhere to other materials, such as rubber.

Shaped structures derived from synthetic linear polyesters such as polyethylene terephthalate are characterized by high strength, high modulus, low chemical sensitivity, low sensitivity to moisture, and other properties which make them highly desirable for many types of uses. The chemical inertness of polyester structures has, on the other hand, been troublesome in that it has made the application of permanent coatings quite difficult. Many types of desirable coatings do not form a good bond with a polyester surface, in contrast, for example, to polyamide surfaces. One important application in which satisfactory bonding has been very difficult to obtain is in the reinforcement of elastomeric structures where a strong bond between the elastomer and the reinforcing polyester structure is imperative for satisfactory performance. Many types of treatments, surface coatings, adhesive formulations, and the like, have been tried but each has suffered from one or more disadvantages. For example, isocyanate pretreatment followed by a top coating of a conventional resorcinol-formaldehyde-latex mixture gives good bonding at low temperatures, but is found to suffer degradation at elevated temperatures, particularly in the presence of moisture.

The present invention provides a novel process for imparting a tightly bonded polyurea coating to polyester structures, thereby providing a surface which is much more adherent to other materials than the untreated polyester base. The process provides a structure which, when overcoated with a conventional resorcinol-formaldehyde-latex adhesive mixture, is readily bonded to rubbers and the bond exhibits a high resistance to thermal degradation as well as hydrolytic degradation. The process of the invention is a simple one, which may be carried out by a yarn manufacturer without the addition of extra steps to normal yarn manufacturing procedures. The treated structure may be further processed on conventional equipment with no special handling being required, and may be stored for long periods of time without degradation.

In accordance with the invention, there is provided a process for changing the surface character of a polyester shaped structure to make it more easily bonded to other materials which comprises applying to an incompletely oriented, shaped structure of a synthetic linear condensation polyester a volatile, inert carrier liquid containing an organic isocyanate of low volatility, and then hot-drawing the polyester structure by heating the structure to a temperature of at least 120° C. in the presence of steam while applying sufficient tension to stretch the heated structure until at least one dimension is at least twice its original value.

By the term "polyester shaped structure" is meant particularly those structures having a longitudinal axis and capable of being drawn and oriented along said axis. The expression "structures having a longitudinal axis" denotes shaped articles of polymers in which at least one dimension of the structure is relatively quite large and at least one dimension of the structure is relatively quite small. The expression, therefore, comprehends ribbons and films as well as filaments and fibers.

The invention finds its greatest utility in the treatment of fibers. Therefore, the following description and examples are presented primarily in terms of fibers, and especially tire yarns.

The expression "incompletely oriented" is intended to indicate that the structure is not fully drawn and is still capable of being stretched along its longitudinal axis until that dimension is a least twice the original dimension. The term thus includes fibers in their "as spun" condition, but excludes drawn fibers in which the residual elongation is less than 100%.

The expression "synthetic linear condensation polyester" denotes a linear polymer comprised of recurring structural units containing, as an integral part of the polymer chain, recurring carbonyloxy groups

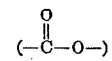

and having a relative viscosity of at least about 25 in a solution of 11 g. of polymer in 100 ml. of a mixed solvent composed of 58.8 parts by weight of phenol and 41.2 parts by weight of trichlorophenol. Preferably, the polymer is one of the polymethylene terephthalates described in U.S. Pats. Nos. 2,465,319; 3,051,212; and 3,216,187.

The expression "volatile inert carrier liquid" denotes a liquid solvent for the organic isocyanate which is non-reactive to the isocyanate and which has a boiling point low enough to allow the liquid to be completely vaporized during the hot drawing step. Preferably, the liquid is a hydrocarbon, an ether, a ketone or an ester with a boiling point below 250° C. Suitable liquids include xylene, ethyl acetate, bis-(2-methoxyethyl)ether and 3-pentanone.

Isocyanate compounds suitable for use in the process of this invention are those organic isocyanates having a boiling point greater than 250° C. with at least one free, nonhindered isocyanate group in the molecule, and further characterized by the presence in the molecule of at least two bonding sites from the class consisting of isocyanate, urea, urethane and amide groups. Suitable isocyanates have an equivalent weight less than 250 where the equivalent weight is determined by dividing the molecular weight by the number of bonding sites.

By "nonhindered isocyanate group" is meant an isocyanate group connected to a primary or secondary carbon atom. Isocyanate groups connected to a tertiary carbon atom are not reactive enough to provide the desired effect.

Isocyanate compounds suitable for use in the process of this invention are illustrated in Table 1.

TABLE 1

| Code | Structure | Chemical name | Isocyanate equivalent weight | Mol. wt. |
|---|---|---|---|---|
| PAPI | [phenyl-CH$_2$ with NCO]$_n$ | Polymethylene polyphenylisocyanate | 131 | (1) |
| MDI | CH$_2$—(C$_6$H$_4$—NCO)$_2$ | Methylene-bis(4-phenylisocyanate) | 125 | 250.24 |
| TDI-Si | H$_3$C—C$_6$H$_3$(NCO)—N(H)—C(O)—N(H)(—CH$_2$)$_3$—Si(OCH$_3$)$_3$ | N-$\gamma$-trimethoxysilanopropyl-N-3-isocyanato-4-methyl-phenylurea. | 176 | 351.43 |
| TDI-trimer | [H$_3$C—C$_6$H$_3$(NCO)—N—C(O)—]$_3$ | Toluenediisocyanate-trimer | 187 | 522.46 |
| TDI-2G-TDI | [H$_3$C—C$_6$H$_3$(NCO)—N(H)—C(O)—O—CH$_2$—]$_2$ | Ethylene-bis(N-3-isocyanato-4-methyl-phenylurethane). | 104 | 410.39 |
| HMI-2G-HMI | [OCN—(CH$_2$)$_6$—N(H)—C(O)—O—CH$_2$—]$_2$ | Ethylene-bis(N-6-isocyanato-n-hexylurethane). | 100 | 398.45 |

[1] Approximately 450 (n=3.5).

Preferably, the isocyanate compound is applied to the polyester structure in sufficient amount to give a coating of 0.05–1.5% by weight, in the case of textile fibers. Where the structure has a shape different from a fiber of normal textile denier, it is more appropriate to measure the coating in terms of grams per square centimeter of surface area. Thus, the useful range of coating may be described as falling in the range $3 \times 10^{-7}$ to $300 \times 10^{-7}$ gms./sq. cm., and the preferred range is $4 \times 10^{-7}$ to $130 \times 10^{-7}$ gms./sq. cm. of surface area.

Following the application of the isocyanate solution to the incompletely oriented polyester structure, it is essential that the treated structure then be hot drawn at least $2\times$ in one dimension by heating the structure to a temperature above 120° C. in the presence of steam while under sufficient tension to stretch the heated structure. In the case of polyester tire yarns, after the isocyanate solution is applied to undrawn yarn, the yarn may be drawn in a steam jet using a steam temperature above 120° C. but preferably in the range 250–400° C. at normal drawing speeds. The apparatus dimensions are such that the exposure time at the desired temperature is at least 0.1 millisecond but no more than about 0.5 second. It will be appreciated that exposure time and temperature must be adjusted to prevent heating the yarn to its melting point.

Heating in steam is essential to obtain the desired result of this invention; dry heat is not suitable. The invention appears to require the conversion of isocyanate groups to urea linkages on the surface of the polyester. The disappearance of free isocyanate groups and the appearance of urea linkages may be explained by assuming that, after vaporization of the carrier liquid, some of the isocyanate groups react with steam to form amine groups which immediately react with other isocyanate groups to form urea linkages, in accordance with the following scheme:

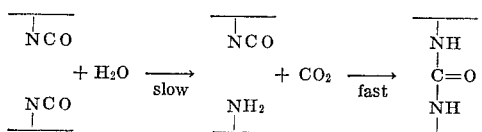

It is well known that the rate of the second indicated reaction is much faster than the first.

It is essential for the invention that this heating in the presence of steam is performed during the drawing operation. Formation of the coating on the nascent surface produced during drawing provides a much better bond than can be achieved otherwise. For example, attempts to apply isocyanate compounds to fully drawn polyester yarns, followed by heating in steam, have been completely unsuccessful in giving the results obtainable with the process of this invention. It is known that the surface area of a cylindrical fiber varies directly with the square root of the draw ratio and that a draw ratio of $2\times$ increases the surface area by about 40%. Apparently, this amount of new surface is sufficient to provide the desirable effects of the invention, but higher draw ratios are preferred.

In a preferred embodiment of the invention, the isocyanate solution is applied to the as-spun yarn during spinning and the yarn is then immediately drawn in one step to a fully oriented yarn in a coupled spinning and steam-drawing operation. The single figure of the drawing is a schematic representation of this embodiment.

Referring to the drawing, filaments 1 from spinneret 2 pass over adhesive applicator roll 3 which applies isocyanate solution contained in pan 4. The treated filaments then pass around feed roll 5 and separator roll 6. From the feed roll the filaments travel through steam jet device 7 to draw rolls 8, 9, and proceed to conventional windup means (not shown).

Alternatively, the filaments may be spun to form yarn and drawn in separate operations, with the isocyanate solution being applied to the undrawn yarn at the drawing machine. If desired, the drawing operation may be carried out in two or more steps, provided that the step in which the filaments are heated in steam follows application of the isocyanate solution and involves a draw ratio of at least $2\times$.

Although the mechanism of the process of the invention is not fully understood, it is believed that an important aspect is the fact that the coating material as applied to the polyester surface, i.e., the isocyanate compound, is a swelling agent for polyesters and not only wets the surface of the polyester but probably becomes entangled with the surface molecules of the polyester as the new surface is formed. Then, upon reaction with steam and conversion of the isocyanate groups to urea linkages, the coating material becomes noncompatible with the polyester. As a result, though still tightly bound to the surface of the polyester, the coating does not act as a swelling agent to cause a lowering of the melting point of the polyester at its surface. This proposed mechanism would account for the better high temperature performance of the coating of this invention. Electron micrographs of coated filament cross sections show a coating about 10 times as thick as would be expected from the amount of coating material applied. This also would be explained by the above mechanism which postulates the penetration of the coating material into the polyester surface to form a molecularly entangled surface layer.

In the process of the invention, polyester structures may be treated with mixtures of those suitable isocyanate compounds described previously. The isocyanate compound may be applied in combination with other agents such as softening agents, antistatic agents and lubricating agents. In a preferred embodiment of the invention, the isocyanate compound is applied in combination with a minor amount (i.e., up to about 10% by weight based on total coating solids) of a lubricating agent consisting of a polysiloxane containing isocyanate side chains. A preferred polysiloxane has the formula

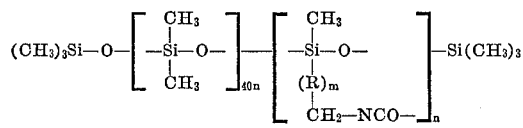

Code: Polysiloxane N where R is an aliphatic or aromatic hydrocarbon diradical and $m$ is an integer from 0 to 3. These lubricating agents appear to prevent interfilament and interstrand friction which may lead to degradation during flexing. They are also valuable in coatings for sewing thread to provide improved performance by reducing friction in sewing operations.

In a preferred embodiment of the invention, polyester tire yarn treated with isocyanate and drawn in steam as described previously is given a separate top coating or "post-draw finish" containing a lubricating agent to improve resistance to fatigue failure under severe service conditions. A preferred lubricant for this purpose is poly ($\beta$-hydroxyethylammonium) acrylate. Immediately prior to applying the "post-draw finish" it is sometimes desirable to apply to the yarn a dilute solution of an amine, e.g., hydroxyethylamine or triethylamine, to insure that the last traces of isocyanate are reacted and converted to another chemical type. Higher adhesive values are obtained.

Polyester structures treated in accordance with this invention are much more easily bonded to other materials than are untreated polyesters. Treated polyester yarns, for example, may be twisted into cords and treated with any of the conventional adhesive mixtures used for polyamide cords to give an excellent bond to rubbers.

In the examples, pretreated yarns are coated with a suitable resorcinol-formaldehyde-latex (RFL) mixture. RFL-1 mixture is prepared by mixing 1.38 parts of resorcinol, 2.02 parts of 37% formaldehyde, 2.39 parts of 1.57% aqueous sodium hydroxide, and 15.4 parts of water. This mixture is aged for 6 hrs. at 75–78° F. (24–26° C.) and then added to a mixture of 30.5 parts of 41% solids butadiene/styrene/vinyl pyridine (70/15/15) copolymer latex and 1.42 ml. of 28% aqueous ammonium hydroxide diluted with 7.64 parts water. The final mixture is allowed to age for 12 hours before using. After applying it to the precoated yarn, the RFL mixture is cured at 190° C. to 245° C., preferably 205° C. to 212° C., for 30–90 seconds with an applied stretch of $-2$ to $+10\%$. Usually, the dry solids pickup in this step in tire cord treatment ranges from 2% to 7% by weight based upon the weight of the original cord.

An alternative adhesive topcoat, RFL-2 mixture, also used in the examples, is prepared by mixing 73.7 gms. of resorcinol, 40.0 gms. of 37% formaldehyde, 148 ml. of water and 480 ml. of a 41% solids butadiene/styrene/vinyl pyridine (70/15/15) copolymer latex diluted with 345 ml. of water, and allowing the mixture to age at room temperature for 5 days.

In the examples illustrating the manner in which the invention may be carried out and the advantages obtained, the strength of the adhesive bond is determined by the "single-end strip adhesion test" (SESA). In preparing examples for the single-end strip adhesion test, lengths of treated cord are placed in the bottom of a steel mold, the cords being parallel with a spacing of 1 inch (2.54 cm.) between cords. The cords are placed under dead weight tension to maintain their position. A sheet of unvulcanized compounded elastomer stock, 125 mils (0.318 cm.) in thickness, is placed over the cords, covered with a cotton duck reinforcing backing, and the top plate of the mold placed over the backing. The mold is put into a platen press. A pressure of approximately 150 p.s.i. (10.5 kg./cm.²) is applied and the mold is usually heated to about 145° C. for 40 minutes. Other vulcanizing conditions appropriate for the individual elastomer compositions may be used. Due to the flow of the rubber stock, the pressure within the mold falls to a low value during the curing cycle. After cooling, the specimen is removed from the press and it is found that the cords are firmly embedded in the cured elastomer stock, but are visible on the surface. This sheet is cut into 1 inch (2.54 cm.) wide strips, each having a cord in the center of its width. The cord end is separated from one end of the strip; the free end of the elastomer strip so obtained is clamped in the upper jaw of an Instron testing machine and the freed end of cord in the lower jaw. The machine is then operated to separate the jaws and thereby to strip the cord from the elastomer sheet in a continuous manner. The tension necessary to strip the cord from the elastomer sheet is determined and is reported in pounds tension per single end of cord. For determination of hot adhesion, the sample is brought to a temperature of 140° C. and held there while the cord is stripped from the elastomer sheet. To determine stability of the bond under hydrolyzing conditions, samples are heated at 160° C. under one atmosphere water vapor pressure for the indicated number of hours and then tested for adhesion for adhesion as above.

The rubber stock used in the SESA tests has the following composition:

TABLE 2

|  | Parts |
|---|---|
| Smoked sheets | 50 |
| SBR–1500 | 50 |
| HAF Black | 35 |
| Xinc oxide | 3 |
| Stearic acid | 1 |
| Circosol 2XH | 10 |
| Agerite Rosin D | 1 |
| NOBS Special | 1.25 |
| MBTS | 0.25 |
| Sulfur | 2.5 |

The invention will be more fully understood by referring to the following examples which are intended to be illustrative and not limitative. All parts and percentages are on a weight basis, unless the contrary is expressly stated.

EXAMPLE I

Polyethylene terephthalate having a relative viscosity of 30 is melt-spun through a 150-hole spinneret at a throughput of 9.0 lbs./hr. (4.08 kg./hr.). Immediately after quenching, and before convergence of the filaments, the open yarn bundle is passed over a rotating finish role wetted with a solution of 20.0 gms. of polymethylene polyphenylisocyanate (PAPI) in 100 ml. xylene. The wetted yarn passes around a feed roll, then through a 7-inch long (17.8 cm.) steam jet device which is supplied with steam at 300° C. from a steam supply having a pressure of 40 lbs./sq. in. (2.7 atmos.). The yarn proceeds to a draw roll rotating at a speed of 650 yards per minute (590 meters/min.) which provides a draw ratio of 4.0. Exposure time in the steam jet is 0.018 second. From the draw roll the yarn proceeds to a windup. Subsequently, the yarn is twisted and plied to a 100/1/2 cord having 9 turns per inch twist (354/meter) in the singles and 9 turns per inch (354/meter) in the ply. The cord is dipped in RFL-2 mixture (described previously) and heated at 218° C. while maintained at constant length with an exposure time of 60 seconds. The cord gives an initial SESA value of 5.5 lbs. (2.5 kg.). After heating for 16 hours at 160° C. in water vapor at atmospheric pressure the SESA value is 3.5 lbs. (1.58 kg.).

The experiment is repeated using RFL-1 mixture (described previously) instead of RFL-2. The cord gives an initial SESA value of 5.5 lbs. (2.5 kg.), and a value of 3.0 lbs. (1.36 kg.) after 16 hrs. in water vapor at 160° C.

EXAMPLE II

Polyethylene terephthalate having a relative viscosity of 60 is melt-spun through a 192-hole spinneret at the rate of 36 lbs./hr. (163 kg./hr.), quenched, and passed over a finish roll bathed in a solution of 25 gms. of polymethylene polyphenylisocyanate (PAPI) in 100 ml. of an aromatic hydrocarbon mixture having a boiling range of 188-210° C. The conditions used provide a 0.75% solids pickup. The yarn is drawn at a draw ratio of 6.4 in a steam jet supplied with steam at 360° C. The jet is 12 in. (30.5 cm.) in length and the draw roll speed is 2750 yds./min. (2500 m.p.m.), which provides an exposure time in the steam jet of 0.0073 second. The yarn produced, which has a tenacity of 8.5 g.p.d. and a break elongation of 11%, is twisted and plied into a 1022/1/2 cord having 10 turns per inch (394/meter) twist in the singles and 10 turns per inch (394/meter) twist in the ply. The cord is dipped in RFL-2 mixture and hot-stretched 0% at 218° C. with an exposure time of 60 seconds. The cord gives an initial SESA value of 5.0 lbs. (2.26 kg.). After aging in one atmosphere water vapor at 160° C. for 16 hrs., an SESA value of 1.8 lbs. (0.84 kg.) is obtained.

The experiment is repeated with the RFL dip being cured at 176° C. for 60 seconds while the cord is held at constant length. The cord gives an SESA value of 6.0 lbs. (2.72 kg.) initially. After 16 hrs. aging at 160° C. in water vapor, an SESA value of 2.1 lbs. (0.96 kg.) is obtained.

EXAMPLE III

The general procedure of Example II is repeated using as a spin finish 25 gms. of polymethylene polyphenyliscyanate (PAPI) and 0.5 gm. of polysiloxane N dissolved in 100 ml. of the same hydrocarbon solvent used in Example II. The speed of the finish roll is adjusted to give a solids pickup on the yarn of approximately 0.75%. The draw roll speed is 2400 y.p.m. (2194 m.p.m.) giving a draw ratio of 6.1 and an exposure time in the steam jet of 0.0083 second. The precoated yarn, which has a tenacity of 8.5 g.p.d. and a break elongation of 15%, is converted into an 1107/1/2 cord having 10 turns per inch (394/meter) twist in the singles and 10 turns per inch (394/meter) twist in the ply.

A sample of the cord is dipped in RFL-2 mixture and hot-stretched 5% at 218° C. with an exposure time of 60 seconds. The cord gives an initial SESA value of 6.0 lbs. (2.7 kg.) and an SESA value of 2.0 lbs. (0.91 kg.) after 16 hours aging in water vapor at 160° C.

A second sample of the cord is dipped in RFL-2 mixture and heated at 176° C. for 60 seconds while being held at constant length. This sample gives an SESA value of 5.5 lbs. (2.5 kg.) initially. After 16 hours at 160° C. in water vapor the sample gives an SESA value of 1.9 lbs. (0.86 kg.).

EXAMPLE IV

This example illustrates the use of several different subcoating compositions in the process of this invention.

A series of experiments are carried out in which polyethylene terephthalate having a relative viscosity of 30 is melt-spun and drawn in a coupled process to give a 900 denier yarn which is wound up at 650 y.p.m. (594 m.p.m.). Immediately below the quenching zone the quenched yarn contacts a finish roll which is bathed in an organic solvent solution of the isocyanate composition shown in Table 3. The amount of pickup is also shown in the table. The wetted yarn is drawn 4.5× in a steam jet using steam at 300° C. and 40 p.s.i.g. The yarn produced with each coating composition is twisted into a 900/1/2 cord, dipped in a bath of RFL-2, heated for 1 minute at 218° C. while maintained at constant length, and then tested for adhesion with the results shown in the table.

Samples of each of the yarns are also tested for yarn-on-yarn friction at 100° C. The coefficient of friction is recorded in Table 3 below.

|  |  |  | SESA (lbs.) | | |
|---|---|---|---|---|---|
| Isocyanate | Proportion, percent | Subcoat pickup, percent | Initial, 24° C. (kg.) | After 16 hrs. at 160° C. in steam, test at 24° C. (kg.) | Coefficient of friction |
| TDI-Si | 100 | 0.2 | 3.1 (1.4) | | 0.40 |
| TDI-Si | 100 | 0.5 | 5.1 (2.3) | | 0.45 |
| TDI-Si | 100 | 0.9 | 5.1 (2.3) | | 0.47 |
| TDI-Si plus PAPI | 50/50 | 0.3 | 5.8 (2.6) | | 0.35 |
| TDI-Si plus PAPI | 50/50 | 0.5 | 6.5 (2.94) | | 0.38 |
| PAPI | 100 | 0.3 | 5.0 (2.26) | | 0.46 |
| PAPI | 100 | 0.8 | 5.5 (2.5) | | 0.56 |
| PAPI plus Lube* | 95/5 | 0.3 | 4.5 (2.04) | 1.5 (0.68) | 0.21 |
| PAPI plus TDI-Si plus Lube | 47.5/47.5/5 | 0.3 | 3.8 (1.7) | 1.0 (0.45) | 0.25 |
| PAPI plus TDI-Si plus Lube | 47.5/47.5/5 | 0.6 | 6.5 (2.94) | 2.2 (1.0) | 0.05 |
| PAPI plus TDI-Si plus Lube | 47.5/47.5/5 | 0.8 | 6.5 (2.94) | 2.1 (0.95) | 0.05 |

*Note.—Lube: Polysiloxane N.

The data show that lower friction is observed when the isocyanate mixture contains polysiloxane N.

EXAMPLE V

Experiments using several different isocyanate compositions are carried out in the manner of Example IV above, with the exception that the polymer is spun into a 720-denier yarn instead of a 900-denier yarn. Each yarn is corded and tested for adhesion with the results shown in the following table.

TABLE 4

|  |  | SESA (lbs.) | |
|---|---|---|---|
| Isocyanate | Subcoat Pickup, percent | Initial, 24° C. (kg.) | After 16 hrs. at 160° C. in steam, test at 24° C. (kg.) |
| HMI-2G-HMI | 0.45 | 4.0(1.8) | 1.8(0.82) |
| TDI-2G-TDI | 0.40 | 4.7(2.1) | 1.9(0.86) |
| TDI-trimer | 0.47 | 4.8(2.2) | 2.0(0.92) |
| MDI | 0.25 | 5.5(2.5) | 2.2(1.0) |

EXAMPLE VI

This example describes identification tests made on a coating imparted to polyester yarn in accordance with the principles of the invention.

500 grams of coated yarn, prepared as described in Example II but with a heavier coating solids pickup of 0.3%, are dissolved in 4.5 liters of a solvent consisting of a 75/25 (volume/volume) mixture of methylene chloride and trifluoroacetic acid. The solvent dissolves the polyester but not the coating. The solution is filtered through a fritted glass filter funnel to retain the insoluble coating material which is subsequently washed three times with -00 ml. portions of solvent and then dried for 16 hrs. at 50° C. under vacuum. 1.9 grams of residue is obtained. The residue is subjected to chemical analysis for the elements and compared with values calculated by assuming the reaction mechanism illustrated in the equation below Table 1. Similar analyses are carried out for unreacted PAPI. All of the results are shown in the table below. The change in nitrogen-to-oxygen ratio observed in this test is considered to be a good indication that the proposed mechanism of said equation is the correct one.

TABLE 5

| Element | PAPI (uncured) | | Coating residue | |
|---|---|---|---|---|
| | Calculated | Found | Calculated | Found |
| Percent C | 73.2 | 72.05 | 76.4 | 70.4 |
| Percent H | 3.8 | 4.00 | 5.08 | 5.3 |
| Percent N | 10.7 | 10.91 | 11.9 | 8.8 |
| Percent O | 12.2 | 13.25 | 6.8 | 5.5 |
| N/O | 0.88 | 0.82 | 1.75 | 1.6 |

The coating residue obtained by the above procedure is examined by infra-red absorption spectroscopy and found to have an absorption band at 1665 cm.$^{-1}$, which characteristic of carbonyl groups, and another absorption band at 1610 cm.$^{-1}$, which is characteristic of the N—H group. These absorption bands are good evidence that a secondary urea structure exists in the coating examined.

EXAMPLE VII

This example describes an examination of the physical structure of the surface of a coated polyester yarn prepared in accordance with the invention and compared with another yarn prepared by prior art procedure.

The test yarn is a 1000-denier, 192-filament polyester yarn processed as described in Example II but with the higher concentration of 0.3% PAPI applied and cured on the yarn.

The comparative (control) yarn is prepared by passing a fully drawn polyester yarn over a finish wheel bathed in a 25% solution of polyethylene polyphenylisocyanate (PAPI) in xylene which is rotated with sufficient speed to give a PAPI pickup of 0.3%. The wetted yarn, moving at a speed of 1340 y.p.m. (1225 m.p.m.) is then passed through a 7-inch (17.8-cm.) long steam jet supplied with 350° C. steam at 40 p.s.i. (2.7 atmos.), where the coating is dried under conditions of zero stretch. Exposure time to the steam is 0.0087 second.

Examination of fiber cross sections of the test yarn by electron micrograph at 8000X magnification shows a coating thickness of 2000 angstroms. Similar examination of the comparative yarn shows no detectable coating at 8000X magnification. It is estimated that the coating must be less than 200 A. thick. The calculated thickness of a 0.3% PAPI coating on a polyester fiber having a diameter of 23 microns (5.2 d.p.f.) is 183 angstroms. These observations lead one to the conclusion that the 2000-angstrom coating on the test yarn is not pure coating as applied, but a mixture of coating and polyester substrate. That is, under the conditions obtained in the process of the present invention, the coating polymer penetrates and becomes mixed with the surface molecules of the polyester substrate.

EXAMPLE VIII

This example illustrates an embodiment of the invention in which a post-draw lubricating finish is used to improve the fatigue resistance of polyester tire yarn.

A 1000 denier polyester yarn is coated with polymethylene polyphenylisocyanate (PAPI) and cured according to the general procedure of Example II to give a yarn with a coating of 0.51% coating solids. The coated yarn is passed over a rotating finish wheel bathed in a 15% aqueous solution of poly($\beta$-hydroxyethylammonium)acrylate (PEA) which is prepared by neutralizing polyacrylic acid with $\beta$-hydroxyethylamine using a phenolphthalein end point. The PEA solids pickup on the yarn is 0.7%. This yarn is then converted to a cord of 1000/1/2 construction, with 10.7 turns per inch (421/meter) twist in the singles and 10.9 turns per inch (430/meter) twist in the ply, and overcoated with RFL-1 mixture while hot-stretching at 218° C. for 60 seconds under 5% net stretch. A comparative cord of nearly identical structure is prepared from the same PAPI-treated yarn but omitting the acrylate post-draw finish. The test and comparative yarns are tested for adhesion and for resistance to fatigue in the "disc fatigue test" with the results shown in the table below. The data in the table indicate that the acrylate post-draw finish improves both adhesion and fatigue resistance.

TABLE 6.—CORD PROPERTIES OF PAPI COATED YARN

| | | 24 hr. disc fatigue test | |
|---|---|---|---|
| Post-draw finish | SESA (lb.)* at 24/140° C. | No. of cords broken during fatiguing | Percent strength loss of remaining cords |
| None | 5.7/1.3 | 18 | 100 |
| 0.7% PEA | 5.9/1.7 | 3 | 25 |

*Rubber stock described in Table 2.

In the disc fatigue test, which is similar to ASTM Method D-885, cord is embedded in rubber and subjected to alternate compression and extension cycles at a rate of 2700 cycles per minute for a period of 24 hours. The conditions of the test are adjusted to give 11.7% compression and 7.1% extension.

EXAMPLE IX

The low-carboxyl polyester yarns described by Daniels in U.S. Pat. No. 3,051,212 issued Aug. 28, 1962, are especially difficult to bond to rubber because of the fewer number of reactive sites on the polyester filament surface. This example demonstrates the improved adhesion obtained when such low-carboxyl yarns are coated with polymethylene polyphenylisocyanate (PAPI) by the process of this invention.

A polyethylene terephthalate yarn having a relative viscosity of 59 and a free carboxyl content of 5 eq./million gms., obtained by injecting 0.5% of epoxyphenoxypropane into the molten polymer just prior to spinning, is treated with PAPI according to the general procedure of Example I, but with the amount of coating solids reduced to 0.15%. This coated yarn is then converted to cord of 1000/1/2 construction with 10.7 turns per inch (421/meter) twist in the singles and 10.9 turns per inch (420/meter) twist in the ply. This cord is then dipped in an adhesive mixture prepared according to the method of Shoaf U.S. Ser. No. 320,605, filed Oct. 29, 1963, using a mixture of the phenol adduct of methylene-bis-4-phenylisocyanate (Hylene MP) and a condensation product of epichlorohydrin and glycerol (Epon 812) in the ratio of 2.57:1, with the cord being cured at 218° C. for 60 seconds under a net stretch of 5%. The cord is further coated with RFL-1 and cured at 218° C. for 60 seconds using 0% net stretch. For comparison, a control cord is prepared exactly as described above with the exception that no PAPI is applied in the spin finish. The two cords, test and control, are then tested for adhesion in the single-end-strip adhesion test using the rubber stock of Table 2 with the following results:

TABLE 7

| Pre-draw finish | SESA (lb.) 24/140° C. | SESA (kg.) 24/140° C. |
|---|---|---|
| 0.15% PAPI | 5.8/2.2 | 2.6/1.0 |
| Kerosene solution of an ester of an ethylene oxide condensate | 3.8/0.9 | 1.7/0.4 |

The data in the table indicate that the performance of a "good" polyester-to-rubber adhesive, such as that described in Shoaf Ser. No. 320,605, is improved by treating the yarn in the manner of the present invention.

EXAMPLE X

This example further illustrates the improvement obtained with a "good" polyester-to-rubber adhesive using yarn prepared in accordance with the principles of the invention.

A 1000-denier polyethylene terephthalate yarn having a relative viscosity of 59 is prepared by spinning molten polyester through a 192-hole spinneret, quenching, applying spin finish, and drawing 6.3× in a steam jet supplied with 350° C. steam. The drawing speed is 2750 y.p.m. (2500 m.p.m.). The spin finish, which is applied from a rotating roller, consists of 10 grams of polymethylene polyphenylisocyanate (PAPI) dissolved in 100 ml. of an aromatic hydrocarbon mixture having a boiling range of 180–210° C. The amount of PAPI applied to the yarn is varied by varying the speed of the finish roll. The yarn is converted to cord and overcoated with an isocyanate-epoxy adhesive and an RFL adhesive as described in Example IX and tested for adhesion at 24° C. and 140° C. in the single-end-strip-adhesion test. The adhesion results are shown in the following table, along with results obtained for a comparative yarn prepared with no PAPI in the spin finish.

TABLE 8

| Percent PAPI on yarn | Pre-draw finish roll, r.p.m. | SESA (lb.)* 24/140° C. | SESA (kg.) 24/140° C. |
|---|---|---|---|
| None | | 4.1/1.3 | 1.8/0.59 |
| 0.11 | 16 | 5.2/1.6 | 2.35/0.73 |
| 0.26 | 20 | 6.1/1.7 | 2.76/0.77 |
| 0.33 | 28 | 8.0/2.0 | 3.6/0.91 |

*Rubber stock of Table 2.

As has been demonstrated in the examples, the process of this invention provides a polyester surface which is more easily bonded to other materials. Fibers with this treated surface are useful in the preparation of bonded nonwoven fabrics, synthetic fiber papers, water-repellent tent fabrics and other coated fabrics requiring a more adhesive base. Special advantages are shown for tire yarn bonded to rubber by means of conventional resorcinol-formaldehyde-latex mixtures. Such RFL mixtures are well known in the art and are taught in detail in U.S. Pat. No. 2,990,313.

In the preparation of reinforced rubber structures utilizing the teachings of this invention, the nature of the "rubber" in the final shaped structure is not critical and may be either a natural or synthetic rubber. Furthermore, the technique of applying the rubber to the reinforcing structure prepared in accordance with the present invention is accomplished by conventional and well-known techniques. Reinforced rubber structures produced according to the present invention may be utilized for a wide variety of important industrial applications. They may be used, for example, in the preparation of pneumatic tires for automobiles, buses, tractors and aircraft, in transmission belts, conveyor belts, floor tiles, hoses, raincoats or luggage.

Since many different embodiments of the invention may be made without departing from the spirit and scope thereof, it is to be understood that the invention is not limited by the specific illustrations except to the extent defined in the following claims.

What is claimed is:

1. An improvement in the process of treating synthetic linear condensation polyester filaments to make the surface more easily bonded to other materials, wherein the improvement comprises: coating the polyester filaments, when incompletely oriented and capable of being stretched to at least twice the original length, with a solution of an organic isocyanate of low volatility in an inert volatile liquid having a boiling point below 250° C. and selected from the group consisting of hydrocarbons, ethers, ketones and esters; and then steam-drawing the isocyanate-coated filaments by heating the filaments to a temperature of at least 120° C. in the presence of steam under sufficient tension to stretch the heated filaments to at least twice the original length into fully oriented filaments.

2. The process of claim 1 wherein said organic isocyanate has a boiling point greater than 250° C., has at least one free, nonhindered isocyanate group in the molecule, and has an equivalent weight of less than 250.

3. The process defined in claim 1 wherein said isocyanate solution is applied to the filaments prior to drawing in a coupled melt-spinning and steam-drawing process.

4. The process defined in claim 1 wherein said isocyanate solution is applied to give a coating weighing 0.05% to 0.8% by weight of the filaments.

5. The process defined in claim 1 wherein said isocyanate solution is applied in combination with a lubricating agent consisting of a polysiloxane having isocyanate side chains.

6. The process which comprises melt-spinning ethylene terephthalate polyester to form filaments, applying to the as-spun filaments a solution of polymethylene polyphenylisocyanate in a volatile hydrocarbon having a boiling point below 250° C. to form a coating weighing 0.05% to 1.5% by weight of the filaments and then steam drawing the isocyanate-coated filaments into fully oriented filaments, using a draw ratio of at least 2× in the presence of steam at a temperature in the range of 250° to 400° C. for the steam drawing.

References Cited

UNITED STATES PATENTS

| 2,934,400 | 4/1960 | Siggel et al. | 264—210 |
| 2,938,823 | 5/1960 | Salem et al. | 156—331 |
| 3,090,716 | 5/1963 | Stevens | 156—331 |
| 3,178,391 | 4/1965 | Holtschmidt et al. | 260—46.5 |
| 3,225,094 | 12/1965 | Wolf | 260—453A |
| 2,844,488 | 7/1958 | Meberg et al. | 117—7 |
| 3,117,173 | 1/1964 | Adams | 264—290X |
| 3,233,019 | 2/1966 | Adams | 264—290X |
| 3,452,130 | 6/1969 | Pitzl | 264—290X |

JULIUS FROME, Primary Examiner

J. H. WOO, Assistant Examiner

U.S. Cl. X.R.

264—137, 290, 343; 117—7, 138.8; 8—115.5; 28—59.5, 75